United States Patent
Hoellmann et al.

(10) Patent No.: US 9,649,990 B2
(45) Date of Patent: May 16, 2017

(54) DEVICE AND METHOD FOR OPTICALLY RECORDING THE UNDERBODY OF A VEHICLE

(75) Inventors: Manuel Hoellmann, Heubach (DE); Axel Wendt, Stuttgart (DE)

(73) Assignee: Robert Bosch GMBH, Stuttgart (DE)

( * ) Notice: Subject to any disclaimer, the term of this patent is extended or adjusted under 35 U.S.C. 154(b) by 611 days.

(21) Appl. No.: 13/983,497

(22) PCT Filed: Dec. 30, 2011

(86) PCT No.: PCT/EP2011/074321
§ 371 (c)(1),
(2), (4) Date: Oct. 10, 2013

(87) PCT Pub. No.: WO2012/103999
PCT Pub. Date: Aug. 9, 2012

(65) Prior Publication Data
US 2014/0036082 A1   Feb. 6, 2014

(30) Foreign Application Priority Data

Feb. 3, 2011   (DE) .................. 10 2011 003 553

(51) Int. Cl.
*H04N 7/00* (2011.01)
*B60R 11/04* (2006.01)
*H04N 7/18* (2006.01)

(52) U.S. Cl.
CPC ............ *B60R 11/04* (2013.01); *H04N 7/183* (2013.01)

(58) Field of Classification Search
CPC ..... B60R 1/00; B60R 2300/105; B60R 11/04; B60R 2300/802; H04N 7/181; H04N 7/18
See application file for complete search history.

(56) References Cited

U.S. PATENT DOCUMENTS

| | | | | |
|---|---|---|---|---|
| 4,854,702 A | * | 8/1989 | Stieff | G01B 11/275 33/288 |
| 6,134,792 A | * | 10/2000 | January | G01B 11/2755 33/203.18 |
| 6,397,164 B1 | * | 5/2002 | Nobis | G01B 11/275 356/139.09 |
| 2004/0039544 A1 | * | 2/2004 | Merrill | G01B 11/275 702/147 |
| 2005/0270373 A1 | * | 12/2005 | Trela | H04N 7/18 348/143 |

(Continued)

FOREIGN PATENT DOCUMENTS

| | | |
|---|---|---|
| CN | 101281143 A | 10/2008 |
| CN | 101653937 A | 2/2010 |

(Continued)

OTHER PUBLICATIONS

Gatekeeper Security, http://www.gatekeepersecurity.com.
Advanced Detection Technoloay, http://advanced-detection-technology.com.

*Primary Examiner* — Frank Huang
(74) *Attorney, Agent, or Firm* — Norton Rose Fulbright US LLP; Gerard A. Messina

(57) ABSTRACT

A device for optically recording the underbody of a vehicle using at least one camera, includes at least two mirrors which are disposed and oriented in such a way that images of several areas of the underbody of the vehicle are able to be recorded simultaneously by the camera.

17 Claims, 2 Drawing Sheets

(56) References Cited

U.S. PATENT DOCUMENTS

| | | | |
|---|---|---|---|
| 2006/0132602 A1* | 6/2006 | Muto | H04N 7/18 348/148 |
| 2006/0152711 A1* | 7/2006 | Dale, Jr. | G01B 11/2755 356/139.09 |
| 2006/0170768 A1 | 8/2006 | Riley | |
| 2007/0040911 A1* | 2/2007 | Riley | H04N 7/181 348/148 |
| 2008/0211914 A1* | 9/2008 | Herrera | H04N 7/18 348/148 |
| 2014/0236514 A1* | 8/2014 | Icove | G01V 3/081 702/65 |

FOREIGN PATENT DOCUMENTS

| | | |
|---|---|---|
| WO | 2006059998 A1 | 6/2006 |
| WO | 2006091874 A2 | 8/2006 |

* cited by examiner

DEVICE AND METHOD FOR OPTICALLY RECORDING THE UNDERBODY OF A VEHICLE

FIELD OF THE INVENTION

The present invention relates to a metrological device and a method for the video-based recording of the underbody of a vehicle, particularly a motor vehicle.

BACKGROUND

Various systems are known for optically sensing the underbody of a vehicle. These systems are marketed in the field of safety engineering. See, for example, the webpages at the .com websites available at the www address of "gatekeepersecurity" and the http address of "advanced-detection-technology.com." In addition to an optical sensing unit, these systems as a rule have further diagnostic units, e.g., for vehicle identification or for detecting hazardous materials, persons, etc.

U.S. Pat. App. Pub. No. 2006/0170768 describes a mobile system for inspecting the underbody of the vehicle, having a platform on which a plurality of sensors are mounted, and a data-analysis device to evaluate the data supplied by the sensors. The sensors scan the underbody of the vehicle by moving relative to the platform.

U.S. Pat. App. Pub. No. 2007/0040911 describes a system for observing the underbody of a vehicle using a single camera which is set up to record an image that encompasses the entire width of the underbody of the vehicle. Along its optical axis, the camera has a viewing distance from the underbody of the vehicle which is greater than the Euclidean distance between the camera and the point at which the optical axis of the camera meets the underbody of the vehicle.

Generally, the sensor units or scanning units of known systems for sensing the underbody include a camera whose visual beam is deflected via a mirror onto the underbody of the vehicle.

Depending on the alignment of the mirror, the representation of the vehicle underbody may be distorted. If the visual beam strikes the underbody of the vehicle orthogonally, the underbody is able to be captured directly and without distortion. Otherwise, the perspectively distorted images of the underbody must be rectified by calculation in a further processing step.

Therefore, the following demands are to be placed on the sensing device of an optical scanning unit:
- complete coverage of the width of the underbody with homogeneous spatial resolution;
- distortion-free imaging of the underbody; and
- adequate photo frequency as a function of the overtravel speed In addition, in order to generate an overall image, an evaluation method is needed which joins the individually acquired images together without overlap.

SUMMARY

An object of the present invention is to provide an improved device and an improved method for optically recording the underbody of a vehicle.

The present invention achieves this objective by recording a strip-type image over the entire width of the vehicle underbody with the aid of multiple mirrors.

In particular, the invention includes a device for optically recording the underbody of a vehicle using at least one camera, the device including at least two mirrors which are placed and oriented in such a way that images of several areas of the vehicle underbody are able to be recorded simultaneously by the camera. In so doing, preferably the vehicle is located above the mirrors.

In a method of the present invention for optically recording images of the underbody of a vehicle, the vehicle is moved, preferably in the longitudinal direction of the vehicle, over a device of the present invention, a number of images, each of which includes a partial area of the vehicle underbody, being recorded by the camera.

Owing to the new advantageous configuration of the mirrors according to the present invention, the visual range of the at least one camera may be deflected or deviated in such a way that a plurality of areas of the underbody are able to be captured simultaneously by a single camera.

The visual range of the camera is optimized by the optical deflection via the mirrors.

In this context, each individual reflecting mirror surface arithmetically represents a separate "virtual camera." The reflecting mirror surfaces are calibrated relative to each other, in order to produce one cohesive image of the vehicle underbody from the imagings of the individual reflecting mirror surfaces.

The methods for determining the virtual cameras are known from measurement technology where, for example, what are termed beam splitters, e.g., of a mirror stereo attachment, are used.

The calibration of the mirror deflection is to be regarded as a functional expansion of the geometric conjugate distance equations of the beam paths.

In one example embodiment, the mirrors are staggered relative to each other in the longitudinal direction of the vehicle. In a further example embodiment, the mirrors are staggered relative to each other in the transverse direction of the vehicle.

A staggered placement of the mirrors prevents the mirrors from shadowing each other and interrupting the visual beam between the camera and the underbody of the vehicle. Thus, a staggered placement of the mirrors permits complete coverage of the vehicle underbody using a single camera.

In one example embodiment, the mirrors are placed at an angle of 45° relative to the plane of the vehicle underbody, and deflect the visual beam of the camera through 90° onto the underbody of the vehicle.

Given such a 90° deflection of the visual beam, the image areas of the underbody are picked up by the camera without distortion, and an overall image of the underbody may be produced by directly joining adjacent image areas together. In particular, it is possible to dispense with a costly optical rectification of the images photographed, if the vehicle floor is aligned essentially at a right angle relative to the camera visual beam deflected by the mirrors.

In one example embodiment, the mirrors are disposed at an angle not equal to 45° relative to the plane of the vehicle floor, so that they deflect the visual beam of the camera through less or more than 90° in the direction of the underbody of the vehicle.

In the case of such an oblique, non-perpendicular path of the visual beams, the visual beams emerge from the device in laterally dislocated fashion next to the mirrors, so that openings, which are formed in the upper side of the photographic device to allow the visual beams to emerge, are not located directly over the mirrors, but rather are offset relative to them.

Such a configuration, in which the openings are offset relative to the mirrors, has the advantage that the mirrors are not excessively soiled, even if the openings are not glassed, since dirt particles dropping through the openings do not fall directly onto the mirrors, but rather next to them.

In one example embodiment, at least two mirrors are placed in such a way that at least one area of the vehicle underbody is able to be photographed by the camera from different perspectives. Through such a placement of mirrors, in which at least one area of the vehicle underbody is photographed from different perspectives, a cost-effective 3D reconstruction of at least one area of the vehicle underbody may be realized using only one camera.

In one example embodiment, the camera is disposed to the side of the longitudinal axis of the vehicle, and the mirrors are disposed or lined up transversely to the longitudinal direction of the vehicle, so that the visual beam of the camera in the area between the camera and the mirrors is aligned transversely to the longitudinal extension or direction of travel of the vehicle.

With such a configuration of the camera and mirrors aligned transversely to the longitudinal extension of the vehicle, it is possible to realize a photographic device having an especially compact type of construction, and to utilize the sensor surface of the camera in optimal fashion.

In one example embodiment of a method according to the present invention, images of partial areas of the vehicle underbody are recorded with an adequate frequency adapted to the motion speed of the vehicle, and, little by little, the entire underbody of the vehicle is captured.

The images of partial areas of the vehicle underbody recorded in each case are assembled to form one overall image. In so doing, the complexity of producing the overall image is a function of the imaging perspectives.

The present invention is explained in greater detail in the following with reference to the FIGS. 1-4.

DETAILED DESCRIPTION

Figure 1:
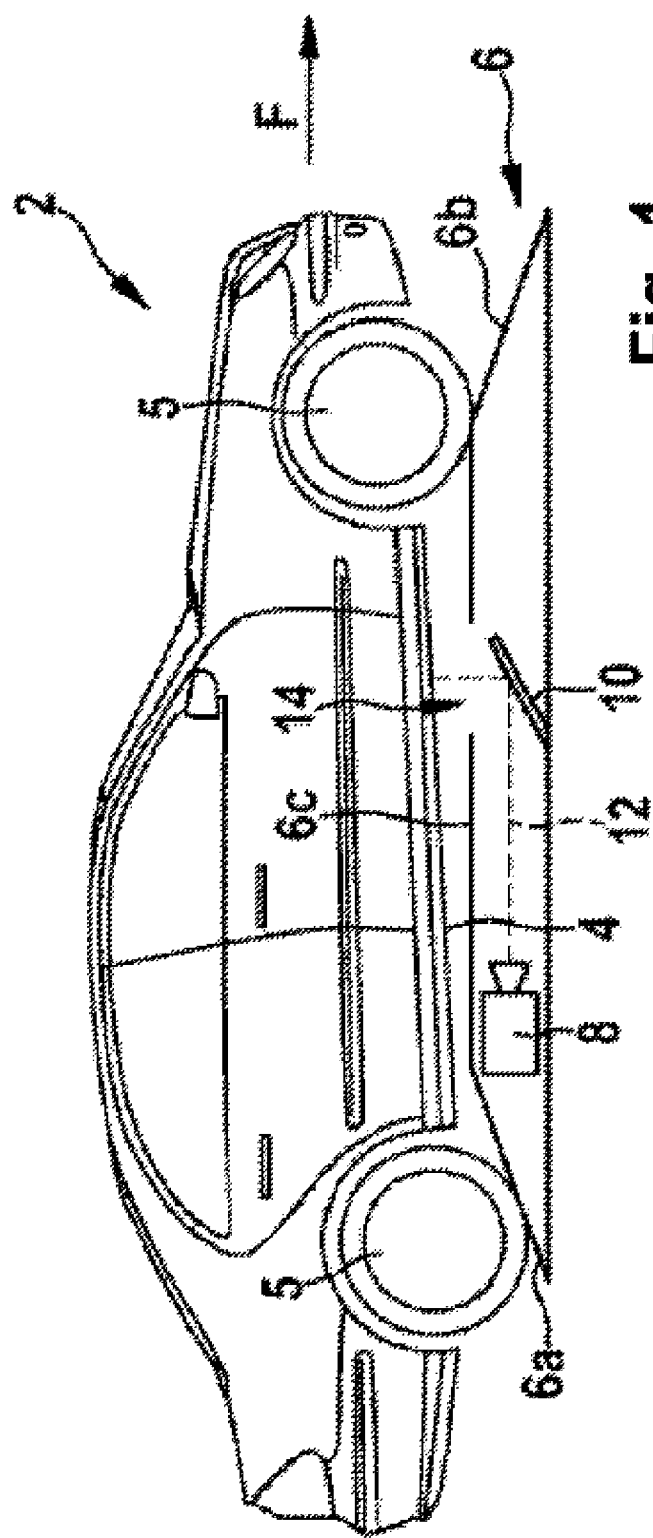
FIG. 1 shows a schematic lateral view of a conventional photographic device for optically recording the underbody of a vehicle.

FIG. 1 shows a schematic lateral view of a conventional photographic device 6 for optically recording underbody 4 of a vehicle 2.

Located within photographic device 6 is a camera 8 which is designed to record images of underbody 4 of a vehicle 2 that is moved over photographic device 6.

To that end, an opening 14 is formed on an upper side 6c of photographic device 6 facing underbody 4 of vehicle 2. Below opening 14, a mirror 10 is disposed within photographic device 6 in such a way that mirror 10 deflects a visual beam 12 of camera 8 through opening 14 onto underbody 4 of vehicle 2, or projects an image of an area of underbody 4 of vehicle 2 into the lens of camera 8.

If vehicle 2 is moved in travel direction F (from left to right in FIG. 1) over photographic device 6, various strip-shaped areas of underbody 4 of vehicle 2 are projected in succession by mirror 10 into camera 8, and camera 8 shoots strip-shaped images of underbody 4, each of which extends over the entire width of vehicle 2, in succession. The strip-shaped images are assembled by an evaluation unit, not shown in the figures, to form one, preferably uninterrupted, overall image of underbody 4 of vehicle 2, which is output via a suitable output device such as a screen and/or a printer. A storage device may also be provided to store the images for archiving and/or later evaluation.

Camera 8 and mirror 10 are placed in such a way that visual beam 12 of camera 8 in the area between camera 8 and mirror 10 runs essentially parallel to the longitudinal axis of vehicle 2.

In the exemplary embodiment shown in FIG. 1, photographic device 6 is in the shape of a rise, so that wheels 5 of vehicle 2 roll over sloping ramp areas 6a, 6b onto photographic device 6 and down from it. Alternatively, photographic device 6 may also be integrated into the shop floor in such a way that upper side 6c of photographic device 6 is level with the shop floor, and sloping ramp areas 6a, 6b may be avoided.

Figure 2:
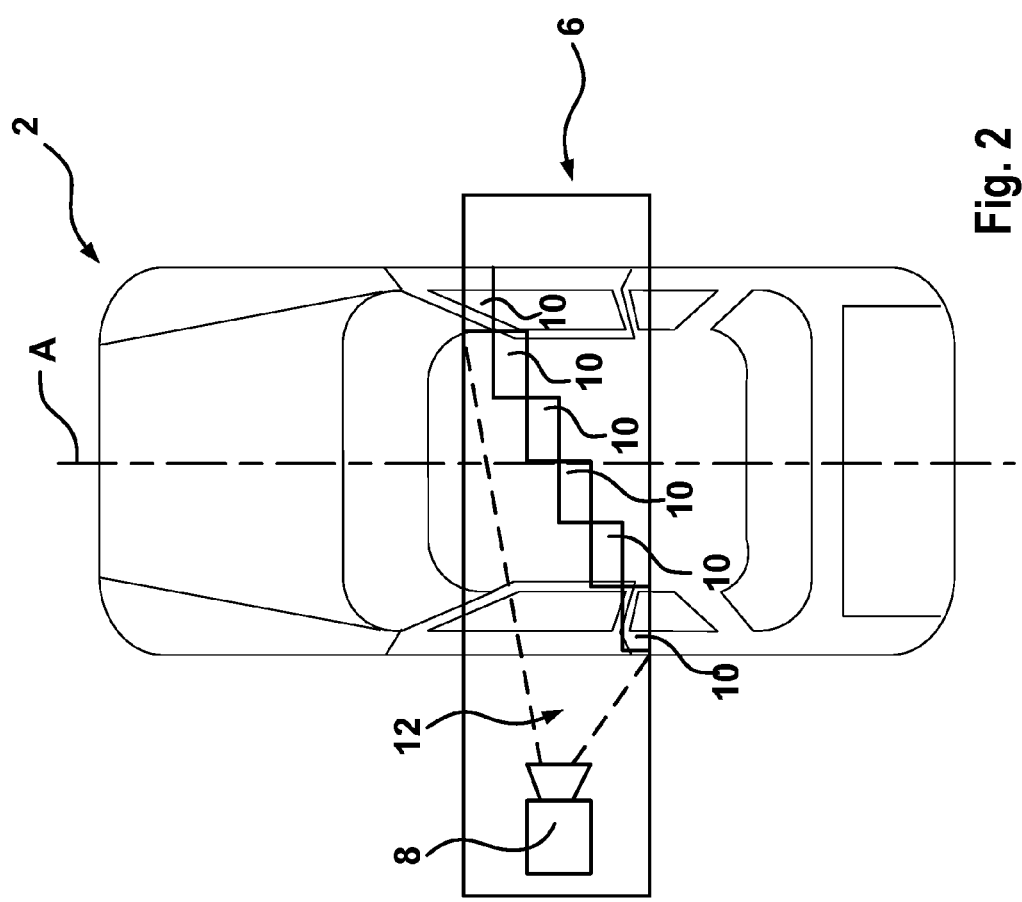
FIG. 2 shows a schematic plan view of an example of a photographic device according to an example embodiment of the present invention.

FIG. 2 shows a schematic plan view of an example photographic device 6 according to an example embodiment of the present invention, on which a vehicle 2, likewise represented schematically in the form of an outline, is located.

In the case of a photographic device 6 according to the example embodiment shown in FIG. 2, camera 8 is disposed to the side of vehicle 2 and visual beam 12 of camera 8 runs essentially transversely to longitudinal axis A of vehicle 2.

A plurality of mirrors 10 are located below vehicle 2. Mirrors 10 are staggered relative to each other in the longitudinal direction and transverse direction of vehicle 2, and in each instance, project an area of visual beam 12 of camera 8 onto a corresponding area of underbody 4 of vehicle 2 and/or project an area of underbody 4 of vehicle 2 into the field of view of camera 8.

Mirrors 10 are placed in such a way that together, they capture the entire width of underbody 4 of vehicle 2 and project it into field of view 12 of camera 8.

If vehicle 2 moves in travel direction F essentially parallel to its longitudinal axis A over photographic device 6, in each case a different area of underbody 4 of vehicle 2 is projected in succession by at least one of mirrors 10 into field of view 12 of camera 8, so that little by little, entire underbody 4 is captured by camera 8 during the movement of vehicle 2.

The placement of camera 8 to the side of vehicle 2 and the transverse path of the field of view or of visual beams 12 permit an especially compact type of construction of the system made up of mirrors 10 and camera 8.

Figure 3:
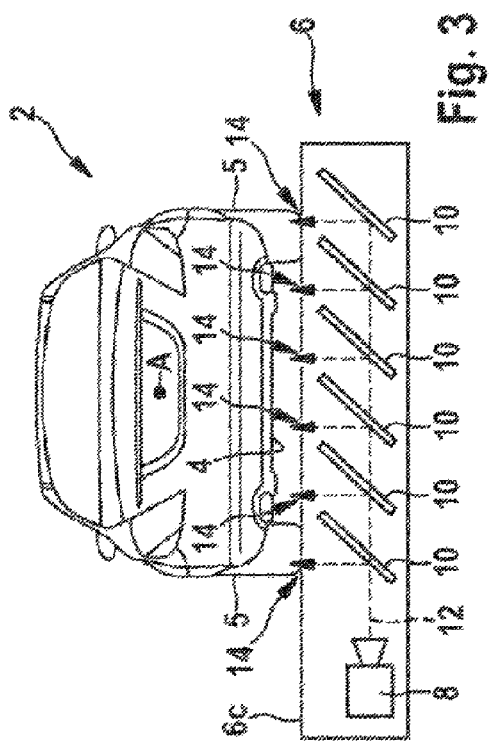
FIG. 3 shows a schematic sectional view of an example photographic device according to an example embodiment of the present invention.

FIG. 3 shows a schematic sectional view of the photographic device 6 according to an example embodiment of the present invention, with direction of view parallel to longitudinal axis A or in travel direction F of vehicle 2. Below vehicle 2, including underbody 4 and wheels 5, photographic device 6, including camera 8 and, in this example embodiment, six mirrors 10 staggered relative to each other, is discernible.

Mirrors 10 are disposed in such a way that they deflect the field of view and/or visual beams 12 of camera 8 by 90° from the horizontal direction, up in the direction of underbody 4 of vehicle 2. For example, FIG. 3 shows the mirrors 10 arranged at an angle of 45° relative to the horizontal direction to provide the 90° deflection.

That is, in the example embodiment represented in FIG. 3, visual beams 12 initially run horizontally, parallel to underbody 4 of vehicle 2, are deflected at a right angle up in the direction of vehicle 2, and emerge from photographic device 6 through openings 14 formed in upper side 6c of photographic device 6 and located directly over respective associated mirror 10, so that, in each instance, an image of a (partial) area of underbody 4 of vehicle 2 corresponding to the respective mirror 10 is projected into camera 8.

Such a placement of mirrors 10 at an angle of 45° relative to the horizontal has the advantage that the areas of underbody 4 are imaged without distortion, and an overall image of underbody 4 may be produced by directly joining adjacent image areas together, if underbody 4 is aligned essentially horizontally and parallel to upper side 6c of the photographic device. In particular, it is possible to dispense with a costly rectification of the images captured.

Figure 4:
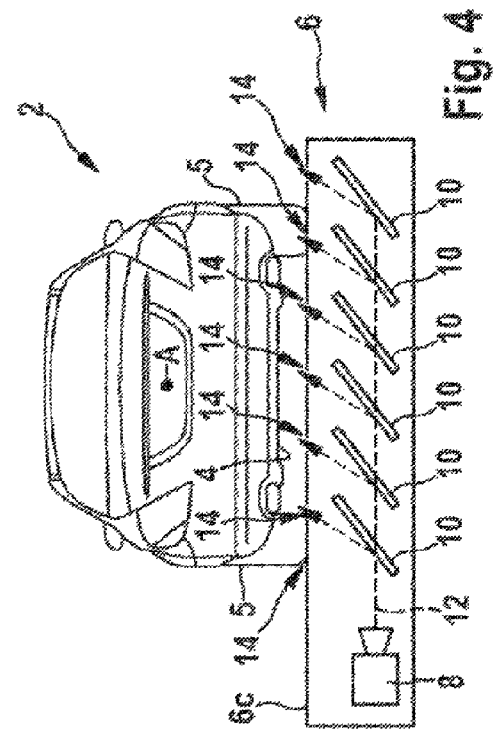
FIG. 4 shows a schematic sectional view of an example photographic device according to an alternative example embodiment of the present invention.

FIG. 4 shows an alternative example embodiment in which mirrors 10 are not oriented at an angle of 45° relative to the horizontal, so that they deflect visual beams 12 of camera 8 at an angle not equal to 90°.

Since in the example embodiment illustrated in FIG. 4 visual beams 12 are deflected obliquely, that is, not at a right angle, they emerge obliquely, i.e., at an acute angle, from photographic device 6 through openings 14, which are formed in upper side 6c of photographic device 6. In particular, visual beams 12 do not emerge from device 6 directly vertically aligned over, but rather laterally offset with respect to, e.g., next to, mirrors 10; and openings 14, which are formed in upper side 6c of photographic device 6 to allow visual beams 12 to exit, are not disposed vertically aligned over mirrors 10, but are rather laterally offset relative to them.

Such an offset placement of openings 14 has the advantage that mirrors 10 are not directly soiled, even if openings 14 are not glassed, since dirt particles possibly falling through openings 14 do not fall directly onto mirrors 10, but rather laterally next to them.

According to an example embodiment, the distortion of the images of underbody 4 shot by camera 8, caused by the oblique path of visual beams 12, is corrected by calculation before the images are assembled to form one overall image of underbody 4.

Suitable orientation of mirrors 10 allows even areas of underbody 4 of vehicle 2 which are difficult to see to be captured by camera 8 and monitored.

In a further example embodiment not shown in the figures, at least several mirrors 10 are disposed in such a way that at least one area of underbody 4 is projected simultaneously from different perspectives into camera 8, and thus is able to be viewed simultaneously from different perspectives using a single camera 8. In this manner, a 3D-reconstruction of at least one area of underbody 4 of vehicle 2 may be realized inexpensively using only a single camera 8.

What is claimed is:

1. A device for optically recording an underbody of a vehicle, the device comprising:
   at least one camera disposed to the side of a longitudinal axis of the vehicle so that a line of sight of the camera is perpendicular to the longitudinal axis of the vehicle; and
   a plurality of mirrors disposed and oriented in such a way that images of several areas of the underbody of the vehicle are able to be recorded simultaneously by the camera when the vehicle is positioned over the device, wherein:
      all of the mirrors are staggered with respect to each other in the longitudinal direction of the vehicle so that reflective surfaces of all the mirrors face the same direction and so that any axis running perpendicularly to the longitudinal axis of the vehicle intersects only one of the mirrors.

2. The device of claim 1, wherein at least two of the mirrors are disposed at an angle of 45° relative to a top surface of the device.

3. The device of claim 1, wherein at least two of the mirrors are disposed at an angle not equal to 45° relative to a top surface of the device.

4. The device of claim 1, wherein at least two of the mirrors are placed in such a way that at least one area of the underbody of the vehicle is able to be photographed by the camera from different perspectives when the vehicle is positioned over the device.

5. The device of claim 1, wherein the device is configured to construct an image of substantially an entirety of the underbody of the vehicle based on images projected by the mirrors to the camera in a first direction while an entirety of the vehicle passes over the device in a second direction essentially perpendicular to the first direction.

6. A method for optically recording images of an underbody of a vehicle moving over a device including a camera, comprising:
   recording, by the camera, images of partial areas of the underbody of the vehicle, wherein the device includes a plurality of mirrors disposed and oriented in such a way that images of several areas of the underbody of the vehicle are simultaneously recordable by the camera when the vehicle is positioned over the device, wherein:
      all of the mirrors are staggered with respect to each other in the longitudinal direction of the vehicle so that reflective surfaces of all the mirrors face the same direction and so that any axis running perpendicularly to the longitudinal axis of the vehicle intersects only one of the mirrors, and
      the camera is disposed to the side of the longitudinal axis of the vehicle so that a line of sight of the camera is perpendicular to the longitudinal axis of the vehicle.

7. The method of claim 6, wherein different ones of the images are recorded in succession at a constant frequency.

8. The method of claim 6, further comprising:
   assembling the images to form one overall image.

9. The method of claim 6, wherein the mirrors are offset relative to each other with respect to a longitudinal axis of the vehicle during the movement of the vehicle over the device.

10. The method of claim 9, wherein the mirrors are offset relative to each other with respect to a transverse axis of the vehicle during the movement of the vehicle over the device.

11. The method of claim 6, wherein the mirrors are offset relative to each other with respect to a transverse axis of the vehicle during the movement of the vehicle over the device.

12. The method of claim 6, wherein the mirrors are disposed at an angle of 45° relative to the plane of the underbody of the vehicle during the movement of the vehicle over the device.

13. The method of claim 6, wherein the mirrors are disposed at an angle not equal to 45° relative to the plane of the underbody of the vehicle during the movement of the vehicle over the device.

14. The method of claim 6, wherein at least two of the mirrors are placed in such a way that at least one area of the underbody of the vehicle is able to be photographed by the camera from different perspectives during movement of the vehicle in a single direction relative to the device.

15. The method of claim 6, wherein, during the movement of the vehicle over the device, the mirrors are disposed to project the images to the camera in a direction that is essentially perpendicular to the longitudinal axis of the vehicle.

16. The device of claim 1, wherein from a perspective that includes a plane perpendicular to a direction of travel of the vehicle over the device and in which the line of sight of the camera is one of parallel to and coplanar with the plane, each mirror is oriented at the same angle as each other with respect to the line of sight of the camera.

17. The method of claim 1, wherein from a perspective that includes a plane perpendicular to a direction of travel of the vehicle over the device and in which the line of sight of the camera is one of parallel to and coplanar with the plane, each mirror is oriented at the same angle as each other with respect to the line of sight of the camera.

* * * * *